United States Patent [19]

Pettit et al.

[11] Patent Number: 4,512,789

[45] Date of Patent: Apr. 23, 1985

[54] FILTER BAG CLAMP

[75] Inventors: Douglas L. Pettit, Owatonna; Calvin E. Piilola, Minneapolis, both of Minn.

[73] Assignee: General Resource Corporation, Minneapolis, Minn.

[21] Appl. No.: 569,039

[22] Filed: Jan. 9, 1984

[51] Int. Cl.³ .............................................. B01D 46/02
[52] U.S. Cl. ................... 55/378; 210/323.2; 248/101
[58] Field of Search ................. 55/374, 378, 379; 210/232, 323.2; 248/94, 101

[56] References Cited

U.S. PATENT DOCUMENTS

| | | | |
|---|---|---|---|
| 1,688,751 | 10/1928 | Schniiger | 248/94 |
| 3,876,402 | 4/1975 | Bundy et al. | 55/379 |
| 4,105,421 | 8/1978 | Rheinfrank, Jr. et al. | 55/379 |
| 4,253,856 | 3/1981 | Paucha | 55/374 |
| 4,266,954 | 5/1981 | Oare et al. | 55/379 |

Primary Examiner—David L. Lacey

[57] ABSTRACT

Apparatus is disclosed for securing a filter bag in hanging suspension through an opening in a baffle plate in a bag housing, including a cover plate having an upwardly extending mouth and a downwardly extending sleeve, a pair of U-shaped clamps constraining the bag against the cover plate, and tensile spring members connected between the U-shaped clamps and over the cover plate.

7 Claims, 3 Drawing Figures

FILTER BAG CLAMP

BACKGROUND OF THE INVENTION

This invention relates to improvements in filter bag housings, and more particularly to an improved clamp for containing filter bags in a secure position in a bag housing while at the same time facilitating quick removal of the clamp and filter bag to enable replacement of the bag.

Filter bag housings are well-known in industrial applications, being usable primarily for filtering particulate matter from air and other gases which become contaminated in industrial processes. Such bag housings are typically of vary large construction, and contain a considerable number of filter bags for handling large volumes of air flow. The filter bags are typically made from cloth or other mesh material of sufficiently fine weave to entrap particulate matter while permitting the flow of gases therethrough, and they require frequent cleaning in contaminated industrial atmospheres. Because such bags are made from fabric material they require periodic replacement, for they are subjected to significant stresses during their operational life.

Such bags are usually contained in large housings, and are mounted in baffle plates which separate the interior of these housings into two compartments. The bags are suspended through these baffle plates into a collection compartment, and contaminated air or gas is admitted into this compartment from some industrial source. The bags typically have a top opening which accesses a second compartment, and the filtered air or gas is removed from this compartment after it has flowed through the fabric material of the bags. The bags are periodically shaken by mechanical or other means, which shaking removes the collected particulate matter from their external surfaces, but after a period of extended use the bags may become broken and require replacement.

When replacement becomes necessary the filter bag housing must be shut down from operation, and a maintenance person enters the upper compartment to remove the damaged filter bag. It is necessary to accomplish this maintenance in as short a time period as possible, for discontinuing the operation of the filter bag housing frequently means closing an industrial process while the maintenance is accomplished.

Therefore there is a need for providing a mechanism for enabling quick replacement of the bags in such a filter bag housing. The present invention solves this need by providing a bag clamping mechanism which is quickly removable for replacement of the bag, while at the same time providing a secure holding mechanism for containing the bag in operation, and without disturbing the sealing required between the bag and the housing.

Accordingly, it is an object of the present invention to provide a filter bag clamping mechanism which is readily removable for bag replacement.

It is a further object of the present invention to provide a bag clamping mechanism which is simple and inexpensive to construct and which may be removed and attached without the need for tools of any type.

It is another object of the present invention to provide a bag clamping mechanism which maintains a sealing relationship between the bag and its housing during operation.

SUMMARY OF THE INVENTION

The invention comprises a pair of clamping plates which are engageable about the lip of a filter bag cover plate, and which clamp the open end of the filter bag securely against the filter bag cover plate, and including at least one tension spring extending between the respective plates for urging the plates toward one another and against the filter bag cover plate, thereby securing the bag in place. The clamping plates may be readily removed from the clamping position by extending the spring members to permit the plates to be removed from their clamping position about the cover plate.

BRIEF DESCRIPTION OF THE DRAWINGS

The preferred embodiment of the invention is described hereinafter, with reference to the appended drawings, in which.

DESCRIPTION OF THE PREFERRED EMBODIMENT

Figure 1:
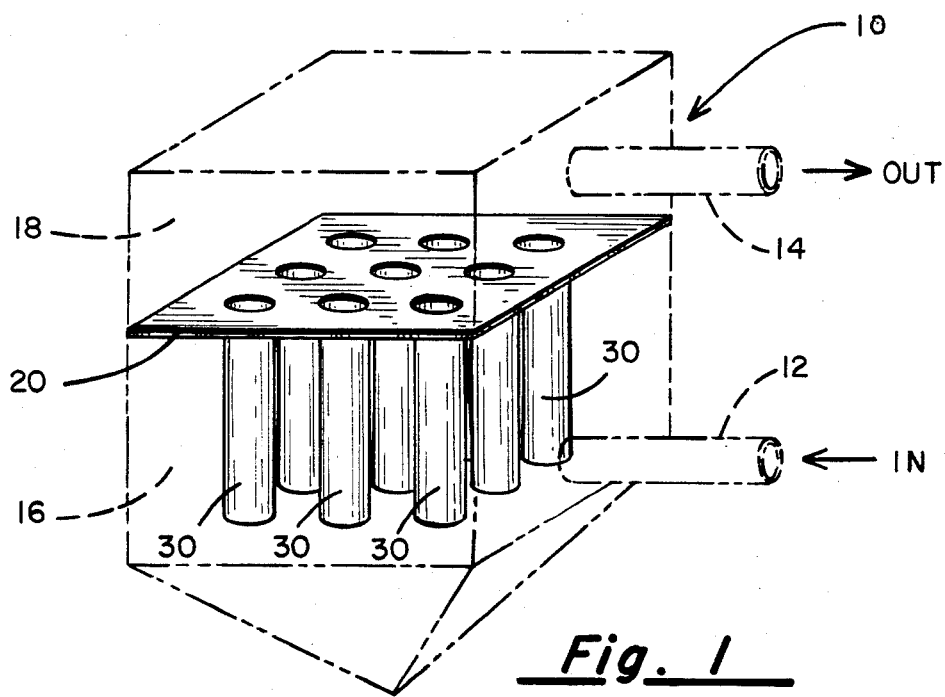
FIG. 1 shows an isometric view of a filter bag housing.

Referring first to FIG. 1 there is shown a filter bag housing 10 of the type generally known in industry. Filter bag housing 10 typically has a dirty gas inlet 12 and a clean gas outlet 14, respectively extending from compartments inside of the housing. The inside of the housing is separated into a dirty gas compartment 16 and a clean gas compartment 18 by means of a baffle plate 20, which baffle plate 20 has a plurality of openings for attachment of a plurality of filter bags 30. Filter bags 30 are typically suspended from the openings in baffle plate 20 and hang downwardly into the dirty air compartment 16. Bags 30 are closed at their bottom ends, and open at their top ends to permit the flow of gas therethrough into compartment 18 from compartment 16. The gas flows through the bag's fabric material, wherein particulate matter is entrapped over the exterior bag surface, and the clean gas passes through the top openings of the bags into compartment 18 and through outlet 14. Filter bags 30 may be periodically cleaned by mechanical shaking, or by directing reverse air jets from compartment 18 downwardly into the interior of the bags to dislodge the particulate matter adhering to the exterior surface of the bags. For simplicity, the cleaning mechanism is not shown in FIG. 1, it being well-known in the art how to construct such cleaning mechanisms.

Figure 2:
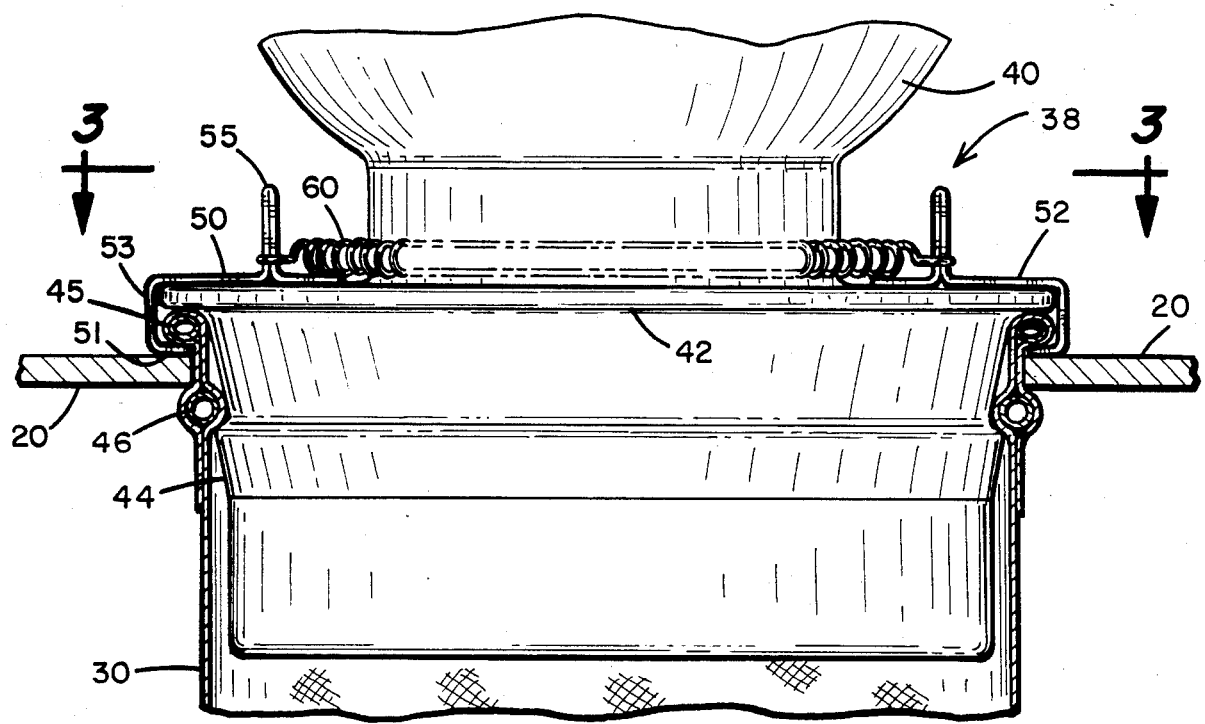
FIG. 2 shows an elevation cross section view of the invention attached to a filter bag.

FIG. 2 shows an elevation cross section view of a typical filter bag mounting construction. The cover assembly 38 includes an open-ended bell mouth pressure pulse receiver 40 mounted on a cover plate 42. This assembly typically fits over the open filter bag end, and holds it in sealable contact against baffle plate 20. A sleeve 44 is attached to the bottom of cover plate 42, and projects through the opening in baffle plate 20 a short distance into the interior of the top opening of filter bag 30. The top end of filter bag 30 is looped around an O-ring 45 and a second O-ring 46 which are respectively mounted above and below baffle plate 20. O-rings 45 and 46 hold the top opening of filter bag 30 against sleeve 44 to maintain filter bag 30 in a suspended position.

A first clamping plate 50 is formed so as to wrap around the edge of cover plate 42, and to fit beneath O-ring 45, thereby holding O-ring 45 against the underside of the extending lip of cover plate 42. A second clamping plate 52 is positioned diametrically opposite clamp 50, and is formed in the same manner as clamping plate 50. Clamping plates 50 and 52 are identically constructed, and therefore a description of one of them will suffice. Clamping plate 50 is formed of sheet metal or similar material into the shape shown in the Figures. A lower lip 51 is formed to extend under cover plate 42 and O-ring 45 a distance which is sufficient to provide a supporting base for O-ring 45. A vertical section 53 extends approximately twice the thickness of cover plate 42, so as to enclose both O-ring 45 and the thickness of cover plate 42. The top portion of clamping plate 50 is formed into a projecting tab 55 having holes therethrough for providing an anchor for a spring 60 and 61.

Figure 3:
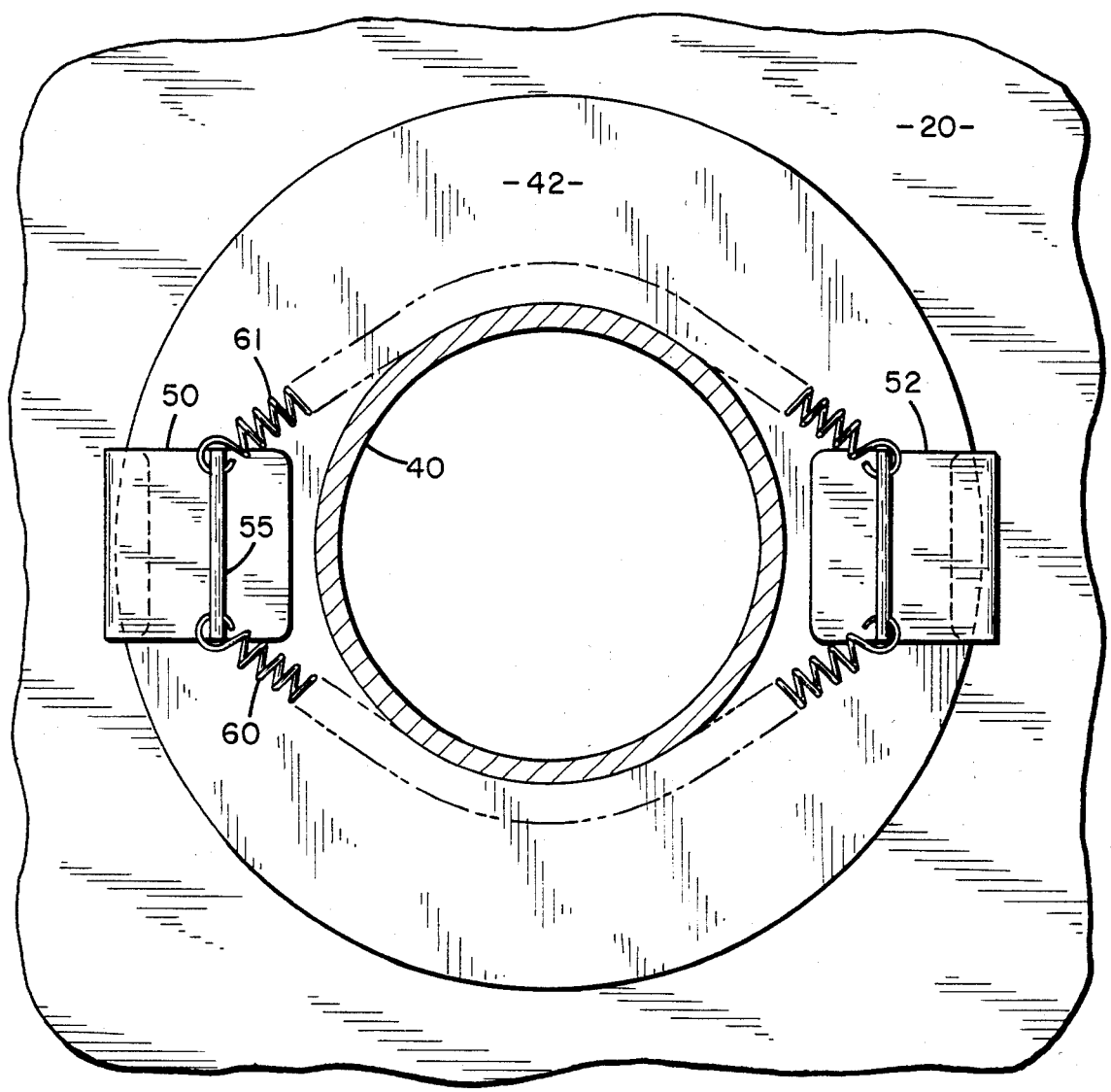
FIG. 3 shows a top view of the invention.

FIG. 3 shows a top view of the invention. Springs 60 and 61 are respectively connected through holes in tab 55, and are deflected about the outside surface of bell mouth 40, and are respectively connected through similar holes in clamping plate 52 on a side diametrically opposite to clamping plate 50.

In operation, the clamping plates are installed as illustrated in the Figures, thereby acting to secure the filter bag in suspended fixed position. If it becomes necessary to replace the filter bag the clamps may be pulled away from their respective locking positions about the cover plate, by grasping tab 55 and exerting outward force against springs 60 and 61. Once the clamps are released from their clamping position the clamping assembly will contract into an inoperative position about bell mouth 40, thereby permitting bell mouth 40 and cover plate 42 to be lifted from contacting the filter bag. When bell mouth 40 and cover plate 42 are removed from the top opening of the baffle plate, the bag may be pulled upwardly out of the filter bag housing, the O-rings removed, and a new bag installed. The installation procedure simply follows a reversal of steps recited herein.

The present invention may be embodied in other specific forms without departing from the spirit of essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for securing a filter bag in suspension in a bag housing through an opening in a baffle plate, comprising
    (a) a cover plate having a bottom downwardly projecting cylindrical section and having a top upwardly projecting mouth;
    (b) at least one resilient O-ring fitted over said cylindrical section and adapted for constraining said bag against said cylindrical section;
    (c) a first U-shaped clamp fitted over an edge of said cover plate, said first clamp having a lower leg for constraining a bag and said at least one O-ring against said cover plate and having an upper leg extending along the top of said cover plate, said upper leg having means for attachment of a spring thereto;
    (d) a second U-shaped clamp fitted over an edge of said cover plate at a position opposite said projecting mouth relative to said first clamp, said second clamp having a lower leg for constraining a bag and said at least one O-ring against said cover plate and having an upper leg extending along the top of said cover plate, said upper leg of said second clamp having means for attachment of a spring thereto; and
    (a) at least one tension spring attached between said first clamp and said second clamp.

2. The apparatus of claim 1, wherein said at least one tension spring comprises two tension springs, each of said springs aligned over said cover plate on opposite sides of said projecting mouth.

3. The apparatus of claim 2, wherein said means for attachment of a spring further comprises an upwardly extending bend in each of said clamp upper legs, said bend having at least one opening therethrough.

4. An apparatus for securing a filter bag in hanging suspension through an opening in a baffle plate in a bag housing, comprising
    (a) a cover plate having an upwardly extending open mouth and a downwardly extending sleeve, and having an internal passage from said mouth to said sleeve;
    (b) a resilient O-ring for fitting about a bag and said sleeve;
    (c) first and second U-shaped clamps, each clamp having a lower leg constraining said O-ring against a lower side of said cover plate, and having an intermediate leg extending across an outer edge of said cover plate, and having an upper leg extending along an upper side of said cover plate, said U-shaped clamps being respectively positioned proximate opposite edges of said cover plate; and
    (d) at least one tension spring above said cover plate and having respective ends connected to an upper leg of each of said U-shaped clamps, thereby urging said U-shaped clamps toward one another and in clamping relation against said cover plate.

5. The apparatus of claim 4, wherein said cover plate further comprises an upwardly extending bell-mouth projection and said at least one spring further comprise two tension springs, each of said springs respectively positioned about opposite sides of said bell-mouth projection.

6. The apparatus of claim 4, further comprising a further resilient O-ring fitted over said sleeve.

7. The apparatus of claim 4 wherein said O-ring is positioned about said sleeve and beneath said cover plate, and said U-shaped clamp lower leg is positioned below said O-ring.

* * * * *